United States Patent
Miyahara

[11] Patent Number: 6,164,947
[45] Date of Patent: Dec. 26, 2000

[54] SAFETY APPARATUS FOR A VERTICAL INJECTION MOLDING MACHINE

[75] Inventor: Kiyoshi Miyahara, Nagano, Japan

[73] Assignee: Nissei Plastic Industrial Co., Ltd., Nagano-Ken, Japan

[21] Appl. No.: 09/327,624

[22] Filed: Jun. 8, 1999

[30] Foreign Application Priority Data

Jun. 22, 1998 [JP] Japan .................................. 10-174972

[51] Int. Cl.[7] .................................................. B29C 43/58
[52] U.S. Cl. ........................... 425/136; 425/151; 425/153
[58] Field of Search ................................... 425/136, 138, 425/589, 151, 153, 154, 595, 150

[56] References Cited

U.S. PATENT DOCUMENTS

| | | | |
|---|---|---|---|
| 3,590,437 | 7/1971 | Annis et al. ................................. | 18/30 |
| 4,509,968 | 4/1985 | Arditty et al. ............................. | 65/10.1 |
| 4,737,093 | 4/1988 | Hori et al. ................................. | 425/151 |
| 4,911,629 | 3/1990 | Fujita ........................................ | 425/135 |
| 5,091,124 | 2/1992 | Zakich ...................................... | 264/40.1 |
| 5,190,714 | 3/1993 | Reinhart .................................... | 264/328.1 |
| 5,198,249 | 3/1993 | Westerkamp .............................. | 425/589 |
| 5,277,568 | 1/1994 | Hirata et al. .............................. | 425/151 |
| 5,391,071 | 2/1995 | Hazarie et al. ........................... | 425/135 |
| 5,689,756 | 11/1997 | Taki et al. ................................. | 399/33 |
| 5,730,373 | 3/1998 | Tamura et al. ............................ | 241/34 |
| 5,834,036 | 11/1998 | Ueno ........................................ | 425/151 |
| 5,931,008 | 8/1999 | Mizutani et al. ......................... | 62/126 |

*Primary Examiner*—Tim Heitbrink
*Assistant Examiner*—Emmanuel Luk

[57] ABSTRACT

A safety apparatus for a vertical injection molding machine. The safety apparatus includes an abnormality detection section for detecting an abnormal condition of a transmission belt, and a stopper mechanism including an engagement rod having a plurality of engagement portions along a moving direction of a movable mold and an engagement member adapted to engage the engagement portion when moved to an engagement position. The engagement rod is provided on one of a side where the movable mold is attached and a side where a stationary mold is attached. The stopper mechanism further comprises a drive control section adapted to move the engagement member to the engagement position for engagement with the engagement portion, when an abnormal condition of the transmission belt is detected by the abnormality detection section. When the abnormality detection section detects an abnormal condition of the transmission belt, the drive control section moves the engagement member to the engagement portion, so that the engagement member comes into contact with the engagement rod. As a result, when the movable mold and associated members are about to fall, a closest engagement portion engages the engagement member, thereby preventing falling of the movable mold and associated members.

16 Claims, 5 Drawing Sheets

SAFETY APPARATUS FOR A VERTICAL INJECTION MOLDING MACHINE

BACKGROUND OF THE INVENTION

1. Field of the Invention

The present invention relates to a safety apparatus for a vertical injection molding machine equipped with a clamping apparatus adapted to vertically move a movable mold by use of a drive unit that includes a rotation transmission mechanism using a transmission belt.

2. Description of the Related Art

Conventionally, there has been known a vertical injection molding machine equipped with a clamping apparatus adapted to vertically move a movable mold in order to carry out a clamping operation.

Such a vertical injection molding machine generally has the following structure. A stationary mold is attached onto a molding machine bed. A movable platen is fixed to the upper ends of a plurality of tie bars which are supported by the molding machine bed to be slidable in the vertical direction. A movable mold is attached to the lower surface of the movable platen, and an injection apparatus is disposed above the movable platen. Meanwhile, a clamping apparatus that utilizes the tie bars is disposed under the molding machine bed. The clamping apparatus includes a drive platen attached to the lower ends of the tie bars and a drive unit for vertically moving the drive platen. The drive unit comprises a toggle mechanism, a ball screw mechanism, a servomotor, and a rotation transmission mechanism. The toggle mechanism is disposed between the drive platen and the molding machine bed. The ball screw mechanism includes a nut attached to the toggle mechanism, and a screw that is rotatably attached to the center of the drive platen. The servomotor is attached to the drive platen and is equipped with a brake. The rotation transmission mechanism connects the servomotor and the ball screw mechanism.

By virtue of the above-described structure, when the servomotor is operated, rotation of the servomotor is transmitted to the screw of the ball screw mechanism via the rotation transmission mechanism, so that the nut is vertically displaced with respect to the screw. Consequently, the toggle mechanism expands and contracts, and the drive platen moves upward and downward, so that the movable mold opens and closes with respect to the stationary mold.

In such a vertical injection molding machine, a relatively heavy portion is moved vertically, in contrast with the case of an ordinary horizontal injection molding machine. Therefore, the drive unit utilizes a servomotor equipped with a brake, which prevents rotation of the screw of the ball screw mechanism when the movable mold is stopped at the open position. The screw of the ball screw mechanism would otherwise rotate due to a load that is imposed thereon in a reverse direction. However, when a transmission belt is used in the rotation transmission mechanism of the drive unit, a considerably strong tension partly stemming from clamping force is applied to the transmission belt, resulting in the following problems. The transmission belt is inevitably placed in a state in which the belt easily breaks. If the belt breaks when the mold is in the open position, heavy members, including the movable mold and the movable platen, fall by gravity; i.e., due to a load that is imposed on the ball screw mechanism in a reverse direction, so that safety cannot be ensured.

In order to solve this problem, as disclosed in Japanese Patent Application Laid-Open (kokai) No. 7(1995)-88922, there has been proposed a safety apparatus which detects breakage of a transmission belt by use of a transmission belt breakage detection switch, and which, upon detection of breakage, locks the screw of a ball screw mechanism by a brake unit attached to the ball screw mechanism to thereby prevent falling of a movable mold and other associated members.

However, the above-described safety device involves the following problems.

First, since the main function of the brake unit is braking, braking performance is insufficient for stopping or locking the screw quickly and reliably. Especially, when a brake unit attached to a clamping apparatus of a vertical injection molding machine and used in an ordinary molding cycle is also used for locking the screw, the above-described problem cannot be avoided, because the braking performance deteriorates quickly due to wearing of pads.

Second, a problem similar to the above-described problem also occurs when transmission becomes impossible due to establishment of a state in which a transmission belt is partially broken but is kept continuous by the remaining unbroken portion, or due to deterioration of the transmission surface (tooth face) of a transmission belt (timing belt). In such a case, the conventional detection means, which only detects presence/absence of the transmission belt by use of a detection switch, cannot detect abnormal conditions (defects) other than breakage of the transmission belt. The conventional detection means has insufficient performance for precisely and reliably detecting an abnormal condition of the transmission belt.

SUMMARY OF THE INVENTION

An object of the present invention is to provide a safety apparatus for a vertical injection molding machine which can quickly and reliably prevent a movable mold and associated heavy members from falling by gravity, which would otherwise occur due to an abnormal condition of a transmission belt, to thereby greatly improve reliability and safety.

Another object of the present invention is to provide a safety apparatus for a vertical injection molding machine which can continuously and reliably detect breakage of a transmission belt as well as precisely and reliably detect an abnormal condition of the transmission belt stemming from other defects.

To achieve the above objects, the present invention provides a safety apparatus for a vertical injection molding machine equipped with a clamping apparatus which vertically moves a movable mold by use of a drive unit that includes a rotation transmission mechanism using a transmission belt. The safety apparatus comprises an abnormality detection section for detecting an abnormal condition of the transmission belt, and a stopper mechanism including an engagement rod having a plurality of engagement portions along a moving direction of the movable mold, as well as an engagement member adapted to engage the engagement portion when moved to an engagement position. The engagement rod is provided on one of a side where the movable mold is attached and a side where the stationary mold is attached. The stopper mechanism further comprises a drive control section adapted to move the engagement member to the engagement position for engagement with the engagement portion, when an abnormal condition of the transmission belt is detected by the abnormality detection section.

When the abnormality detection section detects an abnormal condition of the transmission belt, the drive control section moves the engagement member to the engagement portion, so that the engagement member comes into contact with the engagement rod. As a result, when the movable mold and associated members are about to fall by gravity, a closest engagement portion engages the engagement member, thereby preventing falling of the movable mold and associated members.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

An embodiment of the present invention will now be described in detail with reference to the attached drawings, which are provided to facilitate understanding of the invention and do not limit the scope of the invention thereto. To clarify the invention, detailed description of known parts is omitted.

First, with reference to FIGS. 1 and 2, there will be described the general structure of a vertical injection molding machine M equipped with a safety apparatus 1 according to the present embodiment.

Reference numeral 20 denotes a molding machine bed, which is fixed to an unillustrated machine frame. A stationary mold 5c is attached to the upper surface of the molding machine bed (stationary platen) 20. Four tie bars 21 are supported by the molding machine bed 20 in the vicinity of four corners thereof such that the tie bars 21 are slidable in the vertical direction. A movable platen 22 is fixed to the upper ends of the tie bars 21, and a movable mold 5m is attached to the lower surface of the movable platen 22. An injection apparatus Mi indicated by an imaginary line is disposed above the movable platen 22. Further, a clamping apparatus Mc that utilizes the tie bars 21 is disposed below the molding machine bed 20.

The clamping apparatus Mc includes a drive platen 23 attached to the lower ends of the tie bars 21 and a drive unit 4 for vertically moving the drive platen 23. The drive unit 4 comprises a toggle mechanism 24, a ball screw mechanism 25, a servomotor 26, and a rotation transmission mechanism 3. As shown in FIG. 2, the toggle mechanism 24 is disposed between the drive platen 23 and the molding machine bed 20. The ball screw mechanism 25 includes a nut 25n attached to input links 24i of the toggle mechanism 24, as well as a screw 25s that is rotatably attached to the center of the drive platen 23. The servomotor 26 is attached to the drive platen 23 and is equipped with a brake. The rotation transmission mechanism 3 connects the servomotor 26 and the ball screw mechanism 25. The nut 25n is guided by guide rods 27 to be movable in the vertical direction. The rotation transmission mechanism 3 includes a driven pulley 28i attached to the lower end of the screw 25s, a drive pulley 28o attached to a rotary shaft 26s of the servomotor 26, and a transmission belt 2 formed of a timing belt extending between and wound around the driven pulley 28i and the drive pulley 28o.

By virtue of the above-described structure, when the servomotor 26 is operated, rotation of the servomotor 26 is transmitted to the screw 25c of the ball screw mechanism 25 via the transmission belt 2, so that the nut 25n is vertically displaced with respect to the screw 25s. Consequently, the toggle mechanism 24 expands or contracts, and the drive platen 23 moves upward or downward, so that the movable mold 5m opens or closes with respect to the stationary mold 5c. Further, during clamping, the servomotor 26 applies a predetermined clamping force to the movable mold 5m.

Next, with reference to FIGS. 1–6, there will be described the structure of the safety apparatus 1 according to the present embodiment provided in the vertical injection molding machine M.

The safety apparatus 1 comprises an abnormality detection section 6 for detecting an abnormal condition of the transmission belt 2; a stopper mechanism 9 having an engagement rod 7 provided on a side where the movable mold 5m is mounted and an engagement member 8 provided on a side where the stationary mold 5c is mounted; and a drive control section 10 for displacing the engagement member 8 when an abnormal condition of the transmission belt 2 is detected by the abnormality detection section 6.

Figure 1:
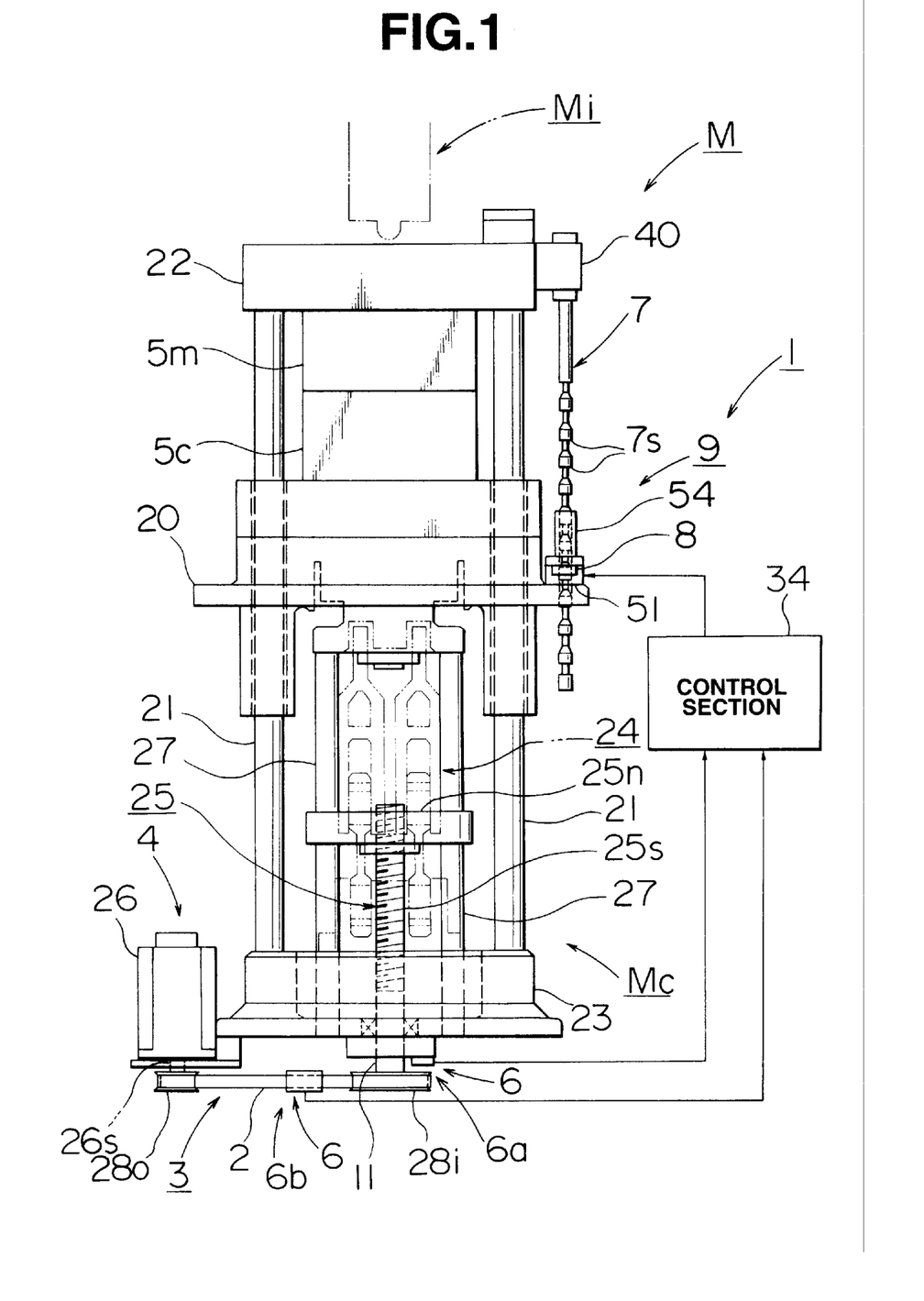
FIG. 1 is a front view of a vertical injection molding machine equipped with a safety apparatus according to the present invention.
Figure 2:
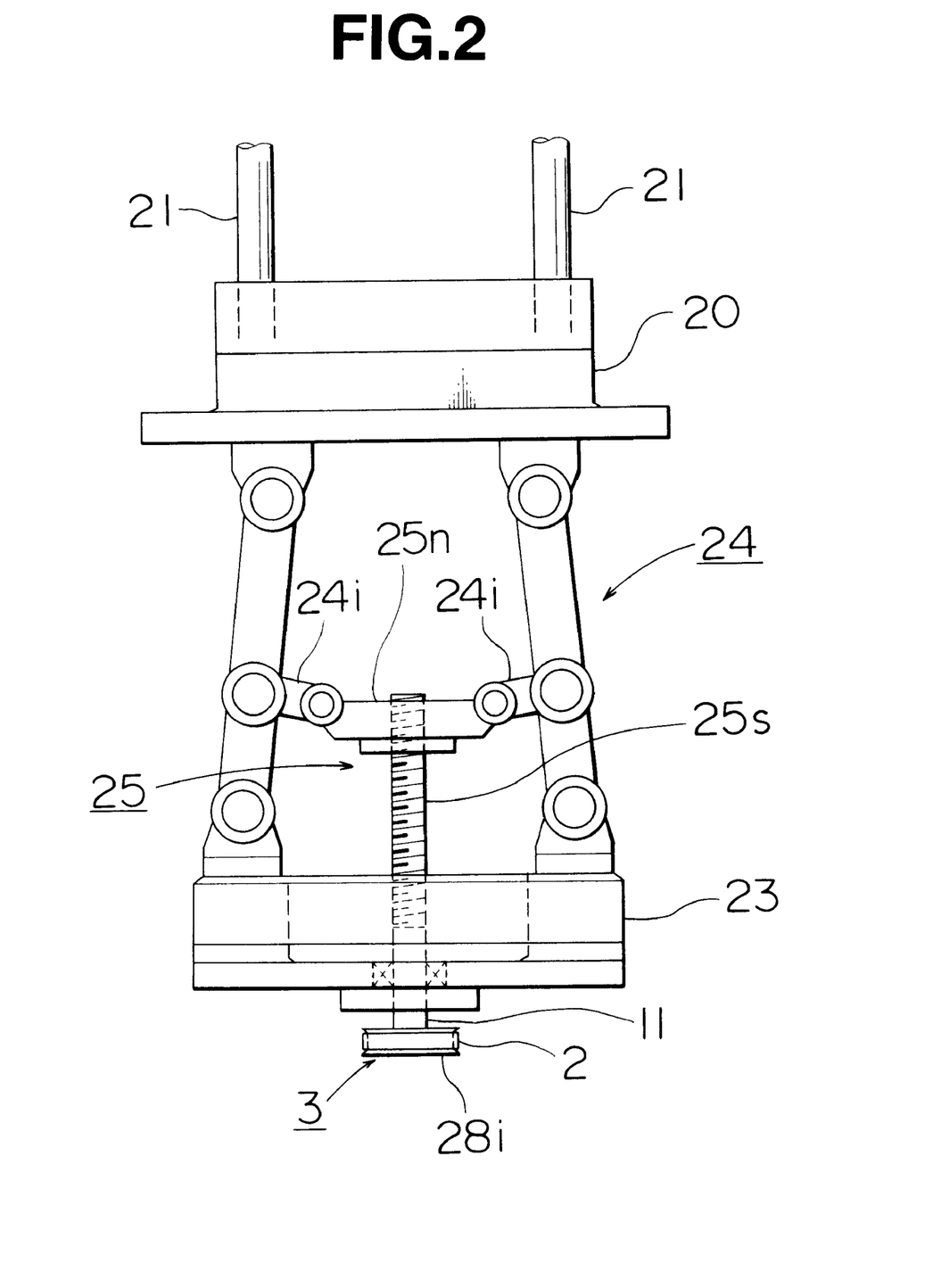
FIG. 2 is a side view showing a portion of the vertical injection molding machine.
Figure 3:
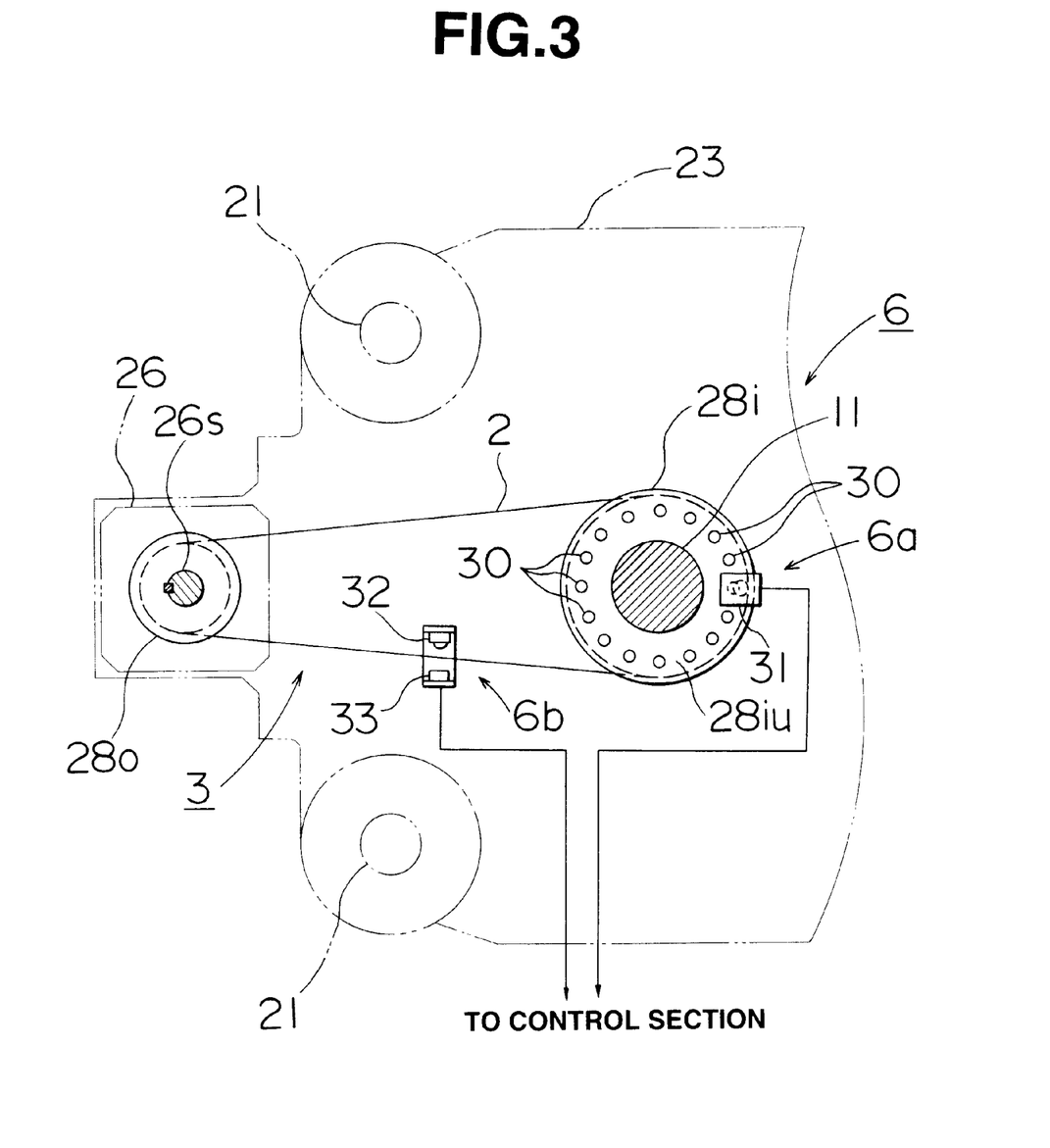
FIG. 3 is a plan view of a rotation transmission mechanism provided with an abnormality detection section of the safety apparatus.

As shown in FIGS. 1 and 3, the abnormality detection section 6 includes a rotation detection section 6a for detecting rotation of the screw 25s (rotation shaft 11) of the ball screw mechanism 25 to which rotation is transmitted form the transmission belt 2, as well as a belt detection section 6b for detecting presence/absence of the transmission belt 2. The rotation detection section 6a is composed of a plurality of magnets 30 attached to the upper end surface 28iu of the driven pulley 28i attached to the screw 25s such that the magnets 30 are arranged at constant intervals in the circumferential direction, and a magnetic sensor 31 such as a Hall element disposed to face the upper end surface 28iu in a non-contacting manner. The belt detection section 6b is composed of a light emitting device 32 and a light reception device 33 disposed on opposite sides of the transmission belt 2 such that they sandwich the transmission belt 2 therebetween. The magnetic sensor 31 and the light reception device 33 are connected to a control section 34.

Figure 4:
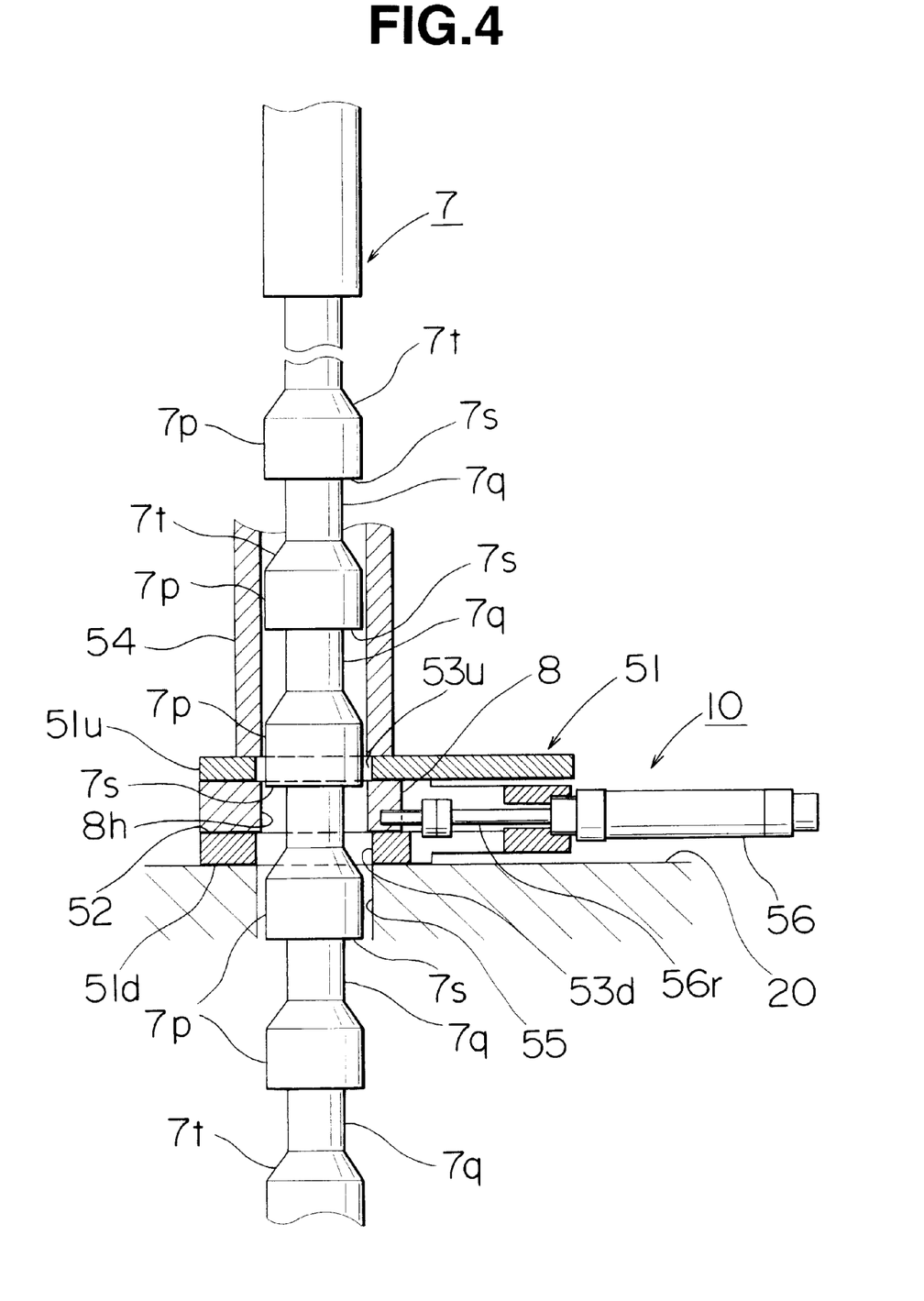
FIG. 4 is a partially sectioned side view of a stopper mechanism of the safety apparatus in an ordinary state.
Figure 5:
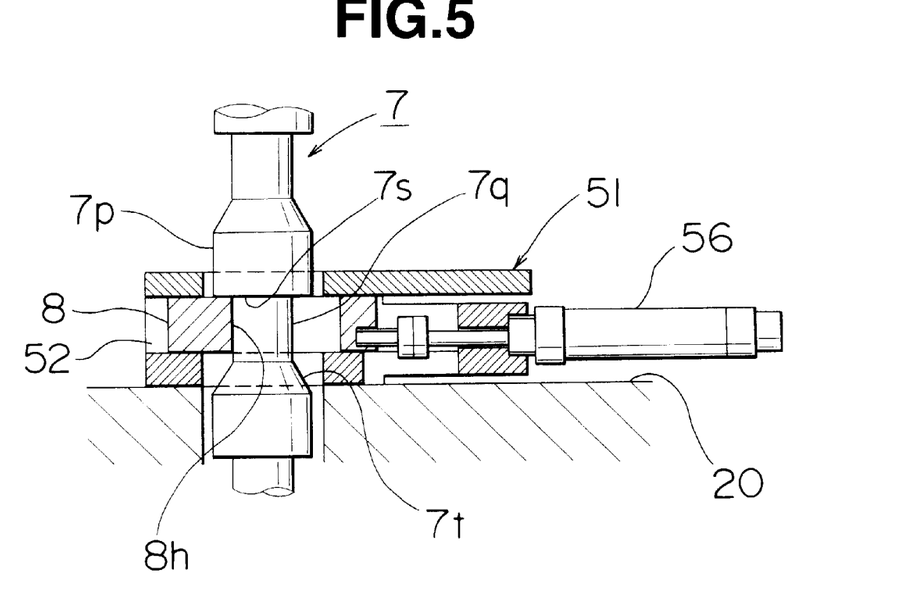
FIG. 5 is a partially sectioned side view of the stopper mechanism of the safety apparatus upon occurrence of an abnormal condition.
Figure 6:
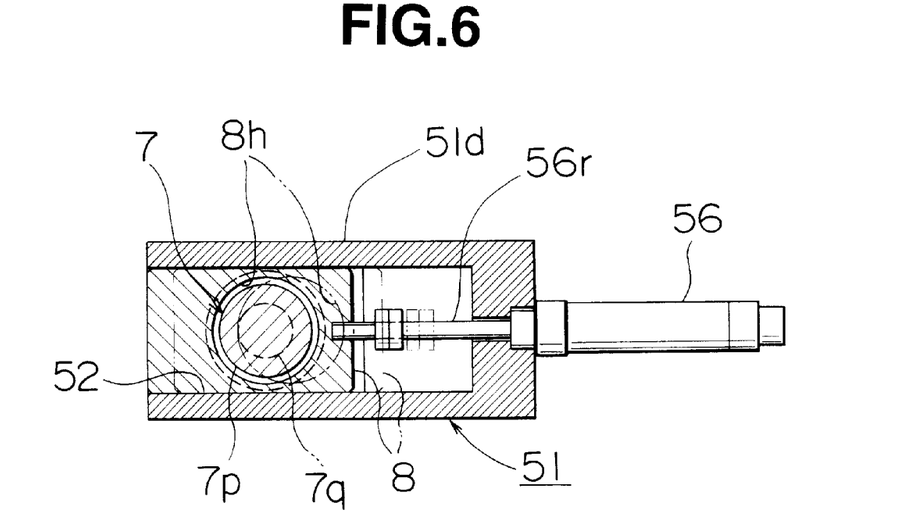
FIG. 6 is a partially sectioned plan view of the stopper mechanism of the safety apparatus.

The engagement rod 7 of the stopper mechanism 9 is supported at its upper end by an attachment member 40 laterally projecting from the movable platen 22 and extends downward to be parallel to the tie bars 21. As shown in FIG. 4, the engagement rod 7 has larger diameter portions 7p and smaller diameter portions 7q alternately arranged along the longitudinal direction (the moving direction of the movable mold 5m). A downward facing stepped portion between a larger diameter portion 7p and a corresponding smaller diameter portion 7q forms an engagement portion 7s that extends perpendicular to the axis of the engagement rod 7. An upward facing stepped portion between a larger diameter portion 7p and a corresponding smaller diameter portion 7q forms a tapered surface 7t.

The engagement member 8 of the stopper mechanism 9 is disposed on the molding machine bed 20. The engagement member 8 is supported by a guide block 51 fixed to the upper surface of the molding machine bed 20 such that the engagement member 8 can be moved along a horizontal direction. The guide block 51 is composed of a lower block 51d having a guide channel 52 for guiding the engagement member 8 along the horizontal direction, and an upper block 51u covering the guide channel 52. Circular through holes 53d and 53u through which the engagement rod 7 passes are respectively formed in the lower and upper blocks 51d and 51u. Meanwhile, the engagement member 8 is formed into a rectangular block of a predetermined thickness. The thickness of the engagement member 8 is set as large as possible in order to secure sufficient strength, provided that the thickness is less than the axial length of the smaller diameter portion 7q of the engagement rod 7. Further, a circular engagement hole 8h through which the engagement rod 7 passes is formed in the engagement member 8. Moreover, a guide sleeve 54 for guiding the engagement rod 7 along the vertical direction is vertically disposed on the top surface of the upper block 51u, and a circular through hole 55 through which the engagement rod 7 passes is formed in the molding machine bed 20.

An air cylinder 56 including a return spring therein is attached to the end portion of the guide block 51 (the lower block 51d). A movable rod 56r of the air cylinder 56 is connected to the end portion of the engagement member 8 accommodated in the guide channel 52. The air cylinder 56 is drive and controlled by the control section 34. Accordingly, the air cylinder 56 and the control section 34 constitute the drive/control section 10 for displacing the engagement member 8 on the basis of results of detection by the abnormality detection section 6. In the present embodiment, the air cylinder 56 is used as the drive means for displacing the engagement member 8. However, there may be used other types of drive means, such as an electromagnetic solenoid, having the same function.

Next, the operation (function) of the safety apparatus 1 according to the present embodiment will be described with reference to the drawings.

When a molding cycle operation is performed in a normal state, pressurized air is supplied to the air cylinder 56, so that the movable rod 56r moves to an advanced position against the spring force of the return spring. As a result, the engagement member 8 moves to a position shown in FIG. 4 (a position indicated by a solid line in FIG. 6), so that the engagement hole 8h is located coaxial with the through holes 53d and 53u. Accordingly, the engagement rod 7 can move freely in the vertical direction without engaging the engagement member 8.

At this time, in the belt detection section 6b, since light from the light emitting device 32 is intercepted by the transmission belt 2, the light reception device 33 maintains an undetected state. Also, the rotation detection section 6a detects a state in which the driven pulley 28i is stopped, or a state in which the driven pulley 28i is rotated in accordance with a control command supplied from the control section 34 to the servomotor 26.

Now, there is assumed a case where the transmission belt 2 is broken in a state in which the movable mold 5m is stopped during opening or closing movement or is stopped at the open position. In this case, the transmission belt 2 cannot remain at a normal position, so that the light reception device 33 receives light from the light emitting device 32 and supplies the control section 34 with a detection signal indicating breakage of the transmission belt 2. Further, since the driven pulley 28i is stopped, or comes into a rotating state contrary to the control command supplied from the control section 34 to the servomotor 26, the control section 34 detects the abnormal motion of the driven pulley 28i. Accordingly, since breakage of the transmission belt 2 is detected by both the rotation detection section 6a and the belt detection section 6b, breakage of the transmission belt 2 can be detected even when one of the rotation detection section 6a and the belt detection section 6b is broken, so that breakage of the transmission belt 2 can be reliably detected.

Upon detection of breakage of the transmission belt 2, the control section 34 stops the supply of pressurized air to the air cylinder 56. As a result, the movable rod 56r immediately moves to a retracted position by the action of the return spring incorporated in the air cylinder 56. Thus, the engagement member 8 moves to a position (engagement position) shown in FIG. 5 (a position indicated by an imaginary line in FIG. 6), so that the inner circumferential surface of the engagement hole 8h comes into contact with the engagement rod 7. Consequently, when the movable mold 5m and associated members are about to fall by gravity, the closest engagement portion 7s engages the engagement member 8, thereby preventing falling of heavy members, including the movable mold 5m and the movable platen 22. Accordingly, the reliability and safety of the molding machine are enhanced considerably.

Next, there is assumed a state in which the movable mold 5m is stopped during opening or closing movement or is stopped at the open position, and an abnormal condition (defect) other than breakage arises in the transmission belt 2; specifically, transmission becomes impossible due to partial breakage of the transmission belt 2 with the remaining unbroken portion maintaining the continuity of the belt, or due to deterioration of the transmission surface (tooth face) of the transmission belt 2. In this case as well, there arises the same problem as in the case where the transmission belt 2 is broken. The belt detection section 6b cannot detect such an abnormal condition of the transmission belt 2; however, the rotation detection section 6a can detect such an abnormal condition of the transmission belt 2. As described above, since the abnormality detection section 6 includes both the rotation detection section 6a and the belt detection section 6b, the abnormality detection section 6 can detect not only breakage of the transmission belt 2 but also an abnormal condition of the transmission belt 2 caused by other defects.

The present invention is not limited to the above-described embodiments. Regarding structural details, shape, material, number of elements, method, and the like, modifications and any omission or addition may be possible as needed without departing from the scope of the invention. For example, the rotation transmission mechanism 3 may have a different structure insofar as the transmission mechanism 3 includes the transmission belt 2. Also, the structure of the stopper mechanism 9 may be modified in such a way that the engagement rod 7 is provided on a member on which the stationary mold 5c is attached, and the engagement member 8 is provided on a member on which the movable mold 5m is attached. Further, although the abnormality detection section 6 includes both the rotation detection section 6a and the belt detection section 6b, the present invention encompasses cases where only one of the rotation detection section 6a and the belt detection section 6b is used. Moreover, although there is shown an illustrative case where the rotation detection section 6a utilizes magnetic means whereas the belt detection section 6b utilizes optical means, no limitation is imposed on their detection principles, provided that the rotation detection section 6a can detect a rotation state, and the belt detection section 6b can detect presence or absence of the transmission belt 2.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A safety apparatus for a vertical injection molding machine equipped with a clamping apparatus which vertically moves a movable mold by use of a drive unit that includes a rotation transmission mechanism having a transmission belt, said safety apparatus comprising:

an abnormality detection section for detecting an abnormal condition of said transmission belt;

a stopper mechanism including an engagement rod having a plurality of engagement portions oriented essentially along a moving direction of said movable mold and an engagement member adapted to engage one of said engagement portions when moved to an engagement position, said engagement rod being provided on one of a side where said movable mold is mounted and a side where said stationary mold is mounted, and said engagement member being provided on the other of said sides; and a drive control section for moving said engagement member to the engagement position for engagement with said engagement portion when an abnormal condition of said transmission belt is detected by said abnormality detection section, wherein said engagement rod is oriented in a substantially vertical direction, said stopper mechanism being engageable with said rod to halt a downward motion of the movable mold when said abnormal condition is detected.

2. A safety apparatus for a vertical injection molding machine according to claim 1, wherein said abnormality detection section comprises a rotation detection section for detecting rotation of a rotary shaft to which rotation is transmitted from said transmission belt.

3. A safety apparatus for a vertical injection molding machine according to claim 2, wherein said rotation detection section comprises a plurality of magnets attached to an upper end surface of a driven pulley at a constant intervals in a circumferential direction, said driven pulley being attached to said rotation shaft and being rotatable driven by said transmission belt; and a magnetic sensor facing the upper end surface of said driven pulley in a non-contacting manner.

4. A safety apparatus for a vertical injection molding machine according to claim 1, wherein said abnormality detection section comprises a belt detection section for detecting the presence or absence of said transmission belt.

5. A safety apparatus for a vertical injection molding machine according to claim 4, wherein said belt detection section comprises a light emitting device and a light reception device disposed with said transmission belt therebetween.

6. A safety apparatus for a vertical injection molding machine according to claim 1, wherein said abnormality detection section comprises a rotation detection section for detecting rotation of a rotary shaft to which rotation is transmitted from said transmission belt; and a belt detection section for detecting the presence or absence of said transmission belt.

7. A safety apparatus for a vertical injection molding machine according to claim 1, wherein said engagement rod has larger diameter portions and smaller diameter portions alternately arranged; and a stepped portion between each larger diameter portion and a corresponding smaller diameter portion serves as said engagement portion.

8. A safety apparatus for a vertical injection molding machine according to claim 1, wherein said engagement member has an engagement hole through which said engagement rod passes and which engages said engagement portion when displaced.

9. The safety apparatus for a vertical injection molding machine according to claim 1, wherein the drive control section further includes:

a guide block supported on a bed of the vertical injection molding machine;

an air cylinder operatively connected to the engagement member; and a spring which biases the engagement member in a direction of engagement with the engagement rod, wherein when the abnormal condition of said transmission belt is detected, the drive control section releases a pressure exerted by the air cylinder against the spring bias, allowing the engagement member to engage one of said engagement portions.

10. The safety apparatus for a vertical injection molding machine according to claim 9, wherein the engagement member includes an aperture, the engagement rod being vertically translatable through said aperture.

11. The safety apparatus for a vertical injection molding machine according to claim 1, wherein an engagement portion is formed from a stepped portion of said engagement rod, the stepped portion including a portion of the engagement rod having a smaller diameter, and a portion of the rod having a larger diameter, the sections being connected by an annular section of the rod which is substantially perpendicular to the longitudinal axis of the rod, wherein the annular section faces downwardly.

12. The safety apparatus for a vertical injection molding machine according to claim 4, wherein when the abnormality detection section detects the absence of said transmission belt, the engagement member is moved into engagement with one of said engagement portions to halt the downward motion of the movable mold.

13. The safety apparatus for a vertical injection molding machine according to claim 1, wherein the abnormality detection section includes:

a belt detection device, the belt detection device being capable of determining the presence or absence of said transmission belt; and a rotation detection device, the rotation detection device being capable of determining the rotation of a rotary shaft to which rotation is transmitted from said transmission belt, wherein both the belt detection device and the rotary detection device communicate with the drive control section, a signal from either device being capable of initiating the movement of the engagement member into engagement with one of said engagement portions.

14. The safety apparatus for a vertical injection molding machine according to claim 13, wherein the belt detection device and the rotation detection device are disposed proximate to a base of the molding machine.

15. The safety apparatus for a vertical injection molding machine according to claim 1, wherein the engagement rod is fixed at one end to a movable platen of the molding machine, on the side where the movable mold is mounted, the rod extending essentially vertically downwardly through a portion of said drive control section, and through a bed of said molding machine.

16. The safety apparatus for a vertical injection molding machine according to claim 4, wherein when the belt detection section detects the absence of the transmission belt, the engagement member engages one of said engagement portions of said engagement rod, the engagement rod then supporting the weight of the movable mold.

* * * * *